Figure 5:
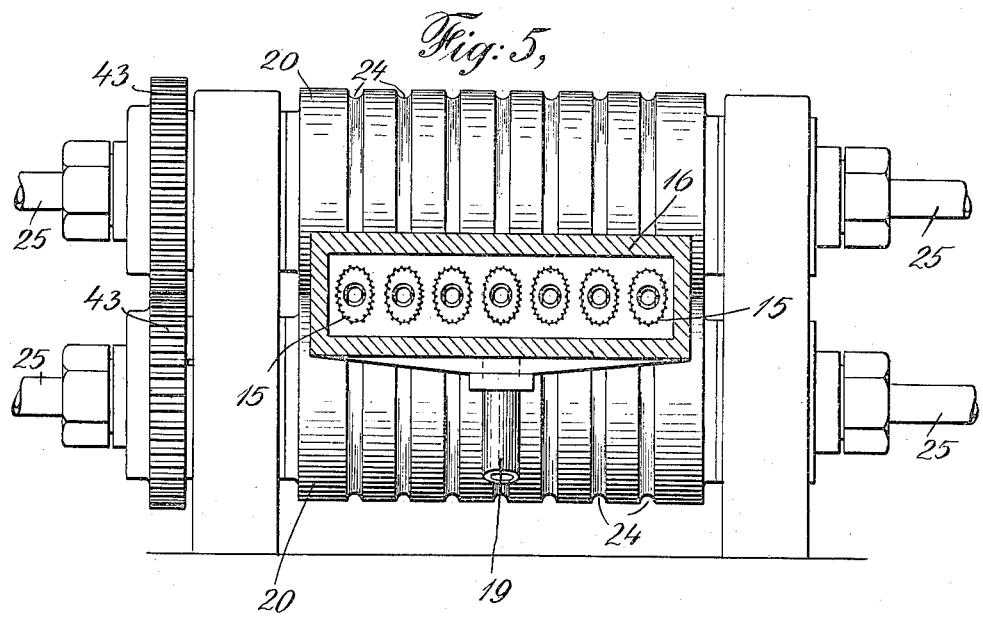

W. B. HUTCHINSON.
MATCH MACHINE.
APPLICATION FILED SEPT. 29, 1911.
1,045,293.
Patented Nov. 26, 1912.
4 SHEETS—SHEET 1.
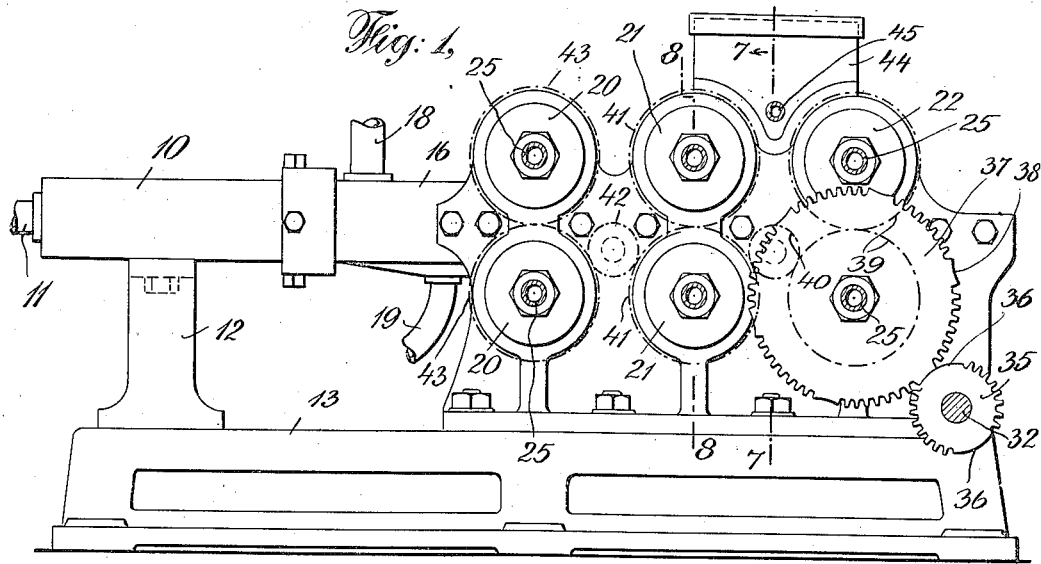
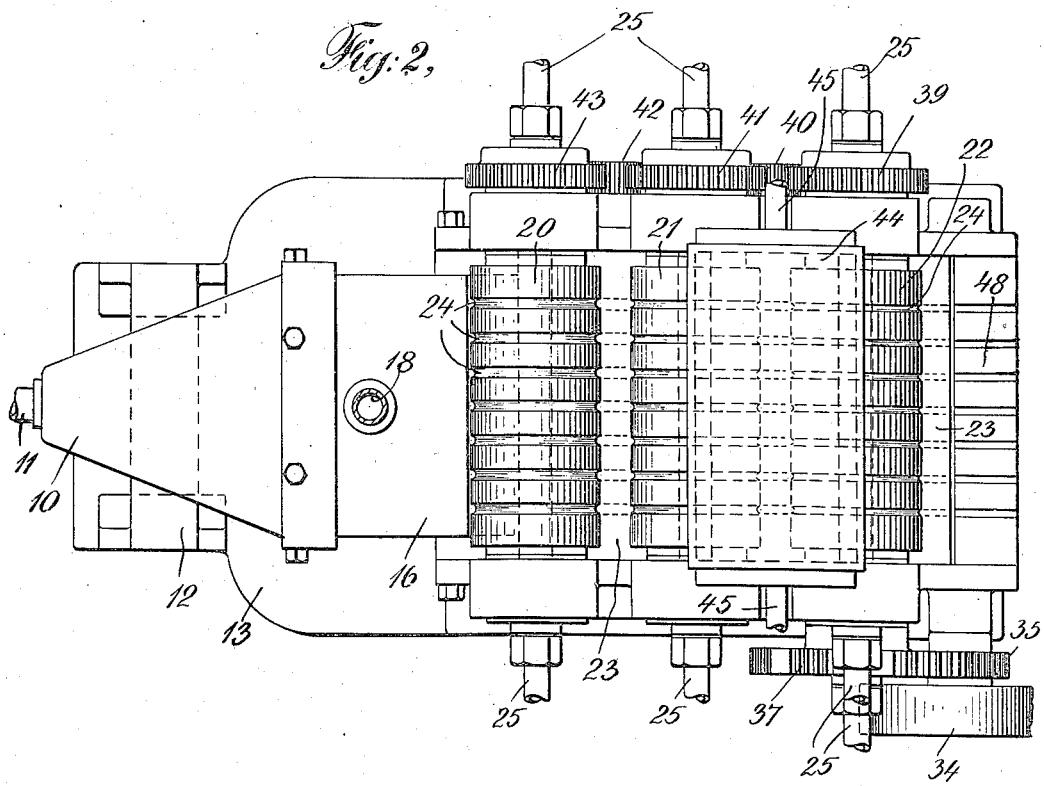
Witnesses:
Warren B. Hutchinson, Inventor.

W. B. HUTCHINSON.
MATCH MACHINE.
APPLICATION FILED SEPT. 29, 1911.
1,045,293.
Patented Nov. 26, 1912.
4 SHEETS—SHEET 2.
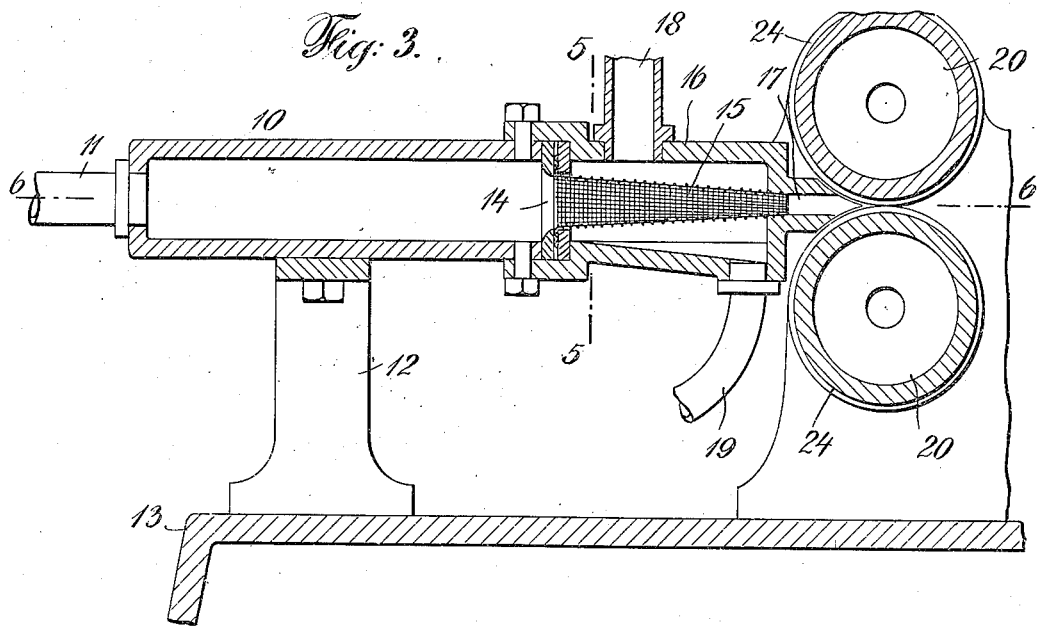
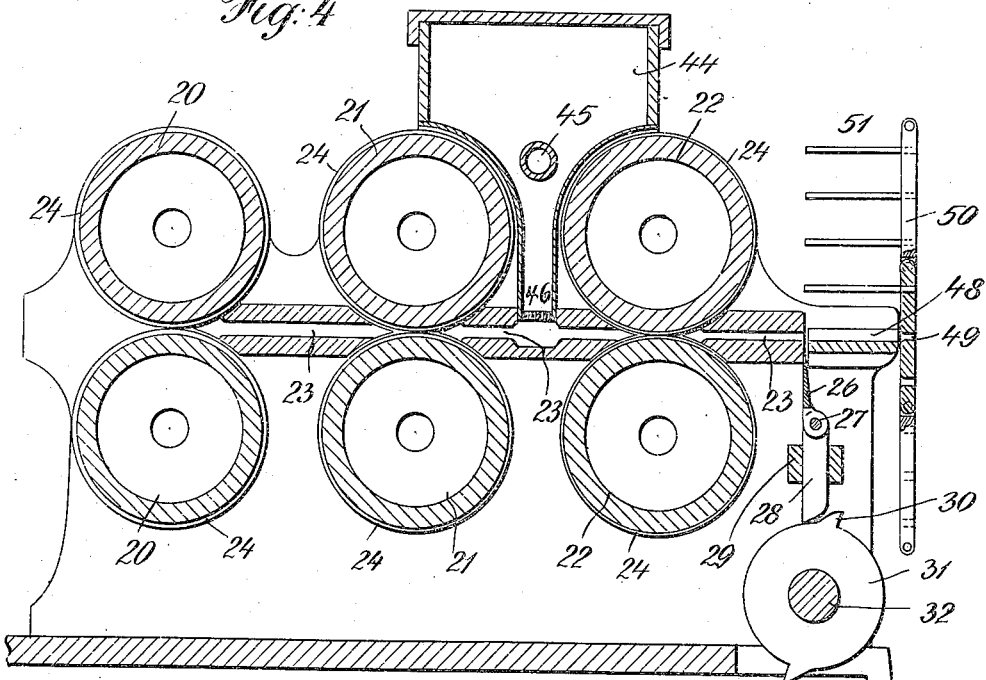

W. B. HUTCHINSON.
MATCH MACHINE.
APPLICATION FILED SEPT. 29, 1911.

1,045,293.  Patented Nov. 26, 1912.
4 SHEETS—SHEET 3.

Witnesses:
Max B. A. Doring
Arthur T. Dannell

Warren B. Hutchinson, Inventor.

W. B. HUTCHINSON.
MATCH MACHINE.
APPLICATION FILED SEPT. 29, 1911.
1,045,293.
Patented Nov. 26, 1912.
4 SHEETS—SHEET 4.
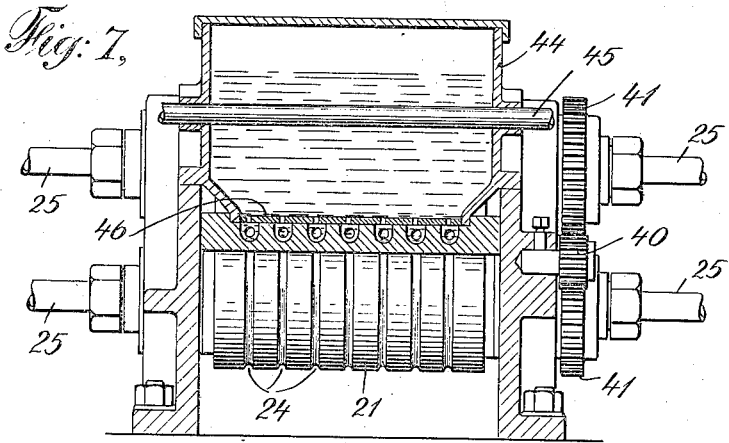
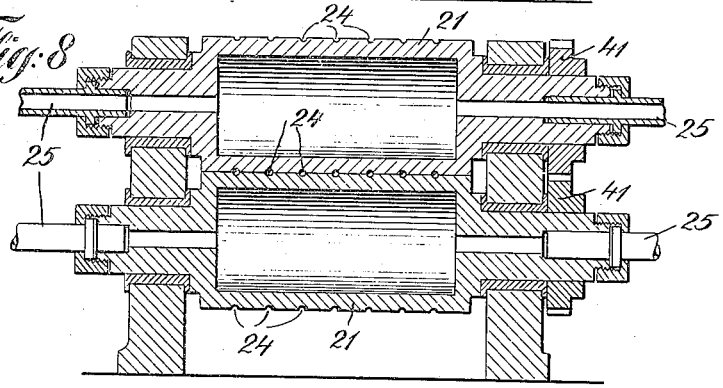
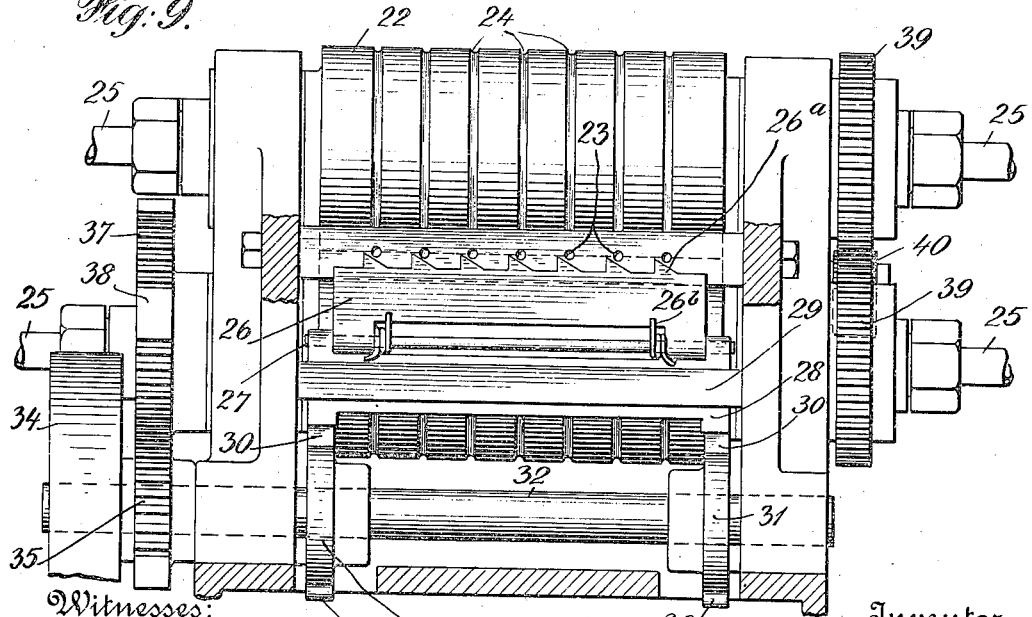

UNITED STATES PATENT OFFICE.

WARREN B. HUTCHINSON, OF NEWARK, NEW JERSEY, ASSIGNOR TO CO-OPERATIVE SYNDICATE, OF NEW YORK, N. Y., A CORPORATION OF MAINE.

MATCH-MACHINE.

1,045,293.  Specification of Letters Patent.  Patented Nov. 26, 1912.

Application filed September 29, 1911. Serial No. 652,001.

*To all whom it may concern:*

Be it known that I, WARREN B. HUTCHINSON, of the city of Newark, county of Essex, and State of New Jersey, have invented a new and useful Improvement in Match-Machines, of which the following is a full, clear, and exact description.

My invention relates to improvements in match machines, and the object of my invention is to produce a match machine which will make matches direct from pulp, taking the latter in its plastic condition, forming it into individual lengths of the size of match splints, and then cutting the lengths of formed pulp into match lengths.

My invention also contemplates forming the pulp into splints and inserting these in a suitable carrier ready for dipping. In carrying out this idea I form the individual splints from the pulpy mass by forcing or squirting them through preliminary forming devices, thus eliminating a great part of the water in the pulp, and then passing the individual members through a series of heated rolls which are grooved to give the said members the desired cross sectional shape and in which the grooves of successive rollers are progressively smaller so that when the splints emerge from the last set of rollers they will be hard, firm, and of the desired size. In making splints in this way I get rid of a great deal of handling which occurs when splints are made from wood and either cut from the block into the carrier, or separately formed strands and put into a carrier, and moreover I make a great saving of material as only the choicest timber can be used for making wood splints, whereas by making them from pulp there is no waste, as cheap timber can be used for making the pulp. However, I do not limit the invention to the use of wood pulp, though this is preferable, as any fibrous pulp can be used for the purpose.

Reference is to be had to the accompanying drawings forming a part of this specification, in which similar reference characters indicate corresponding parts in all the views.

Figure 6:
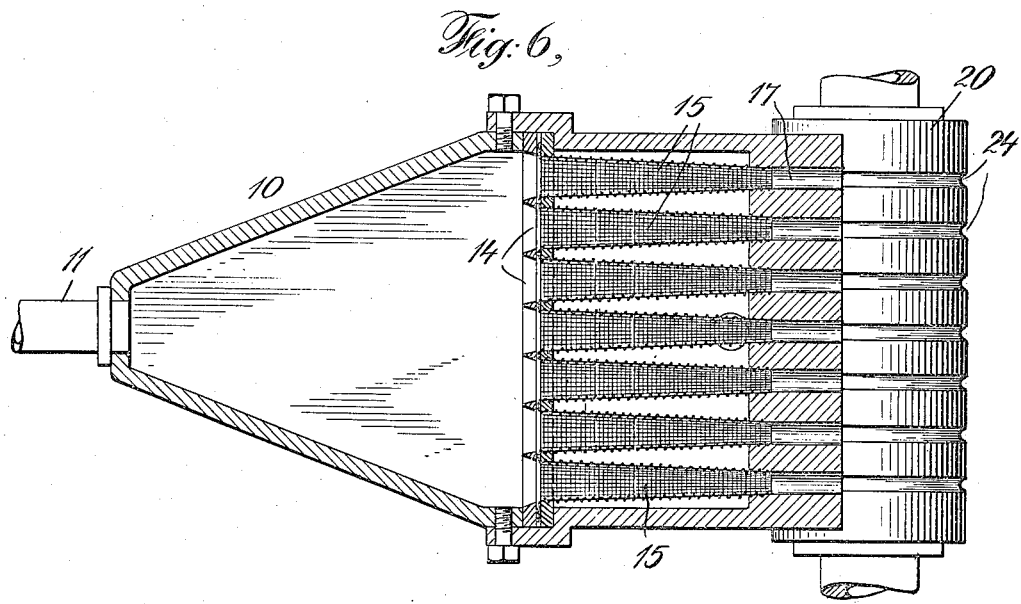

Figure 1 is a side elevation of a machine embodying my invention. Fig. 2 is a plan view thereof. Fig. 3 is a longitudinal section of a portion of the machine. Fig. 4 is a vertical cross section through the forming rolls. Fig. 5 is a cross section on the line 5—5 of Fig. 3. Fig. 6 is a sectional plan on the line 6—6 of Fig. 3. Fig. 7 is a cross section on the line 7—7 of Fig. 1. Fig. 8 is a cross section on the line 8—8 of Fig. 1, and Fig. 9 is a sectional end view showing specifically the cut-off mechanism.

The machine is provided with a small pulp supply tank 10 which is preferably wider at its discharge end than at its inlet, so that the pulp will be fed evenly to all the outlets presently referred to. The tank has a supply pipe 11 so that the pulp can be pumped into it under pressure, and as it comes direct from an agitator there will be no necessity of agitating it in the tank 10, as it will be used so fast that the pumping will serve to sufficiently agitate the mass. The pulp before being introduced into the tank 10 is properly treated to cause it to form impregnated splints, that is splints which will not glow after the flame has burned out, and with suitable materials to make them sufficiently strong and inflammable. In this application I do not claim any means of preparing the pulp, but it is generally understood that the pulp can have incorporated with it phosphoric acid and ammonia to produce the desired impregnation quality, and powdered resin, chlorate of potash, or other materials can be added to give the pulp more consistency and inflammability, while any of the usual chemicals can be applied to give it the desired hardness when dry.

The tank 10 is supported on a suitable pedestal 12 which is carried on the base 13, but any desired framework can be provided for the machine. The pulp in the tank 10 is delivered with considerable force through the outlet openings 14 and into the sieve-like cones 15 which are of fine mesh so that when the pulp is forced through these cones a great deal of the water will be forced out, and individual splint-forming bodies of several times the final size of the splints, will issue from the ends of the cones. The cones are held in a suitable casing 16, and they discharge into guide chutes 17 before passing to the forming and calendering rollers presently referred to. The casing 16 is provided with a suitable pipe 18 which can be connected with a vacuum pump to pump out the vapor and steam from the casing, and a drain pipe 19 carries off the water which is forced from the cones 15. If desired heat can be applied to the casing 16 to hasten evaporation. After passing from the cones 15 and through the guide chutes 17, the pulp passes through a series of rollers 20, 21 and 22, and while I have shown three series of these rollers, any desired number can be used to give the desired reduction to the splint forming bodies and to thoroughly dry them. The rollers just referred to are provided with circumferential grooves 24, and the first set of rollers 20 are relatively far apart and provided with large grooves, while the next set have smaller grooves which are nearer together, and the final set have grooves which will reduce the splint forming bodies to the desired size. The rollers 20, 21 and 22 are heated hot like the ordinary steam heated rollers, and to this end I have shown them provided with steam pipes 25. As the splint forming bodies pass from roller to roller, they are guided through chutes 23 shown best in Fig. 4. It will be observed that the grooves 24 will cause the splint forming bodies to be properly shaped, and the most desirable shape is to have them circular in cross section, but other shapes can be given them if desired. It will be further noticed that I roll the splint bodies practically in the same manner that wire is drawn through heavy metal rollers, and that the result is similar, producing a series of long splint forming bodies.

At the end of the chute 23 I provide a knife 26 which reciprocates across the end of the chute and separates the splint members into individual splints. I wish it understood that I do not claim any specific cut-off mechanism, nor do I limit the invention to the cut-off mechanism shown, as many cut-off devices are now known, and I simply show an operative structure for this purpose. As illustrated the knife 26 is provided with individual blades 26ᵃ (see Fig. 9) which shear across the several chutes 23 and sever the individual splints. The knife 26 is pivoted on a shaft 27 which is supported on a cross-head 28, and springs 26ᵇ (see Fig. 9) hold the knife against the end of the chutes 23. The cross-head 28 reciprocates in a suitable guide 29, and is agitated by cams 30 on the cam wheels 31 which are carried by a rotatable shaft 32 which is mounted in the frame of the machine and is driven by a pulley 34. The shaft 32 carries a mutilated gear 35 (see Figs. 1 and 2) having opposite plain surfaces 36 which come opposite corresponding surfaces 38 on the gear wheel 37 which is driven by the gear 35. In this way I provide for an intermittent cut-off, and the rollers 20, 21 and 22 will stop momentarily while the several splints are cut, thus providing for intermittent motion of the splint carrier which will be hereinafter referred to, but I do not limit the invention to any such arrangement as this, as there are well known cut-off devices for severing splint members by a continuous movement. Most splint carriers, however, move intermittently, and I have adapted the machine to these. The gear wheel 37 is applied to the ends of one of the rollers 22, and the rollers are geared together by gears 39 which connect by the idle gear 40 with gears 41 on the rollers 21, and the gears 41 connect by rollers 42 with gears 43 on the rollers 20. I have tested and shown this driving mechanism to show an operative structure, but obviously the moving parts can be operated in any usual way.

In Figs. 1 and 4 I show a tank 44 which contains paraffin, and this can be melted by running a steam pipe 45 or several pipes if desired, through the tank. The tank has a finely perforated bottom 46, and the hot paraffin drops through upon the splint members just before the latter pass between the rollers 22. This gives a nice surface to the splints, and at the same time makes them inflammable so that they will fire readily when the firing composition on the ends of them is ignited, and it will be observed that by rolling the splints as specified I produce a very handsome splint which will be smoothly calendered.

When the splints leave the ends of the chutes 23 they pass through suitable guides 48 and enter the holes 49 in the carrier plates 50, and when the knife 26 severs the splint members, the individual splints 51 will be held in the carrier bars 50 as usual. Obviously this carrier can be of any suitable kind, and whatever the splint holding devices may be it will be seen that the rollers 22, owing to their relatively large size, will carry the splints quickly forward and insert them forcibly into the holes 49 or equivalent holding devices.

From the foregoing description it will be seen that I can use any ordinary cheap pulp, and that there is absolutely no waste of material from the time that the pulp leaves the tank 10 until the splints 51 are held in the carrier. I wish it understood, however, that if for any reason it is desirable to form the splints separately before inserting them in the carrier, the carrier and guide 48 can be dispensed with. I wish to call attention further to the fact that for convenience I have shown a comparatively few grooves 24 in the several rollers 20, 21 and 22, but in practice the rollers would be made much longer, and a far greater number of grooves formed therein so that more individual splint members will be simultaneously formed.

I claim:—

1. In a machine for forming match splints from pulp, a pulp supply, means for separating the pulp into separate strips or splint producing members, means engaging said members for drawing them longitudinally of themselves, and means for cutting the strips into individual match splints.

2. In a machine for forming match splints comprising a pulp supply, means for separating the pulp supply, means for forming the separated portions of the pulp supply into distinct splint members, and means for severing the splint members transversely.

3. In a match machine, the combination with pairs of rollers arranged in series, the said rollers being circumferentially grooved, the grooves of the succeeding series of rollers being progressively reduced in size, and means for delivering the pulp to the rollers.

4. In a match machine, the combination with pairs of rollers arranged in series, the said rollers being circumferentially grooved, the grooves of the succeeding series of rollers being progressively reduced in size, means for delivering the pulp to the rollers, and means for heating the rollers.

5. A match machine comprising a source of pulp supply, a series of perforate reducing guides receiving the pulp supply and shaping it into individual splint forming members, a series of heated grooved rollers engaging and further shaping the splint forming members, and means for cutting off said splint forming members into individual splints.

6. A match machine comprising a source of pulp supply, a casing, a series of perforate reducing members extending through the casing and receiving the pulp supply to form it into individual splint forming members, means for draining and exhausting the aforesaid casing, a series of heated splint forming rollers engaging the individual splint forming members as they leave the said reducing members, and means for severing the splint forming members into individual splints.

7. A match machine comprising a source of pulp supply, simultaneously acting means for forcing the pulp supply into separated individual splint forming members, a splint carrier, a series of heated reducing shaping rollers engaging the splint forming members and carrying them forward in essentially parallel relation endwise into the match carrier, and means for transversely severing the splint forming members after they are in engagement with the carrier.

8. A machine for forming match splints from pulp comprising a series of pairs of rollers, the said pairs of rollers being separated one from the other, a pulp supply in operative relation to one of the pairs of rollers, means for dividing the pulp supply and directing it to the grooves of said rollers, and means for guiding the compressed pulp from one set of rollers to the other.

9. The combination with a source of pulp supply and a series of splint forming rollers, of the conical perforate members receiving the pulp from the source of supply and directing it to the aforesaid rollers.

10. In a match machine, the combination with the grooved rollers adapted to carry forward the splint members, of means for delivering paraffin upon the said members as they enter between the aforesaid rollers.

11. In a match machine the combination with the grooved rollers adapted to carry forward the splint members, of means for delivering paraffin upon the said members while said members are still hot from contact with the rollers.

12. In a machine for forming match splints from pulp, pulp supplying means, match splint forming members to which the pulp supplying means delivers pulp, said match splint forming members having separating splint receiving recesses whereby the splint members are separately formed, means for carrying and compressing the separate splint members, and means for severing the splint members transversely to form splints.

WARREN B. HUTCHINSON.

Witnesses:
THOMAS T. SEELYE,
ARTHUR G. DANNELL.